(12) United States Patent
Tsuneyoshi et al.

(10) Patent No.: US 7,207,919 B2
(45) Date of Patent: Apr. 24, 2007

(54) METHOD AND APPARATUS FOR ENGAGING ENGINE CLUTCH FOR HYBRID TRANSMISSION

(75) Inventors: Takashi Tsuneyoshi, Yokohama (JP); Toshikazu Oshidari, Yokosuka (JP); Yuki Nakajima, Yokohama (JP); Tomoya Imazu, Yokohama (JP); Shinichiro Joe, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 224 days.

(21) Appl. No.: 11/071,287

(22) Filed: Mar. 4, 2005

(65) Prior Publication Data

US 2005/0202929 A1    Sep. 15, 2005

(30) Foreign Application Priority Data

Mar. 11, 2004    (JP)    ............................. 2004-068715

(51) Int. Cl.
   *B60W 10/02* (2006.01)
(52) U.S. Cl. ............................................. 477/5
(58) Field of Classification Search ............... 477/5, 477/6
   See application file for complete search history.

(56) References Cited

U.S. PATENT DOCUMENTS

| | | | |
|---|---|---|---|
| 5,725,456 A * | 3/1998 | Fischer et al. ............... 477/174 |
| 6,132,335 A * | 10/2000 | Fischer ........................ 477/169 |
| 6,190,282 B1 * | 2/2001 | Deguchi et al. ............... 477/5 |
| 6,655,485 B1 | 12/2003 | Ito et al. | |
| 6,740,002 B1 * | 5/2004 | Stridsberg ..................... 477/14 |
| 2003/0064847 A1 | 4/2003 | Oshidari et al. | |
| 2003/0069104 A1 | 4/2003 | Nakano et al. | |
| 2003/0073534 A1 | 4/2003 | Oshidari et al. | |

FOREIGN PATENT DOCUMENTS

| | | |
|---|---|---|
| JP | 2001-112118 A | 4/2001 |
| JP | 2003-034154 A | 2/2003 |

* cited by examiner

*Primary Examiner*—Dirk Wright
(74) *Attorney, Agent, or Firm*—Foley & Lardner LLP

(57) ABSTRACT

In method and apparatus for engaging an engine clutch for a hybrid transmission, a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion is inhibited and the complete engagement of the engine clutch is carried out when both of the engine side clutch revolution speed of the engine clutch and the transmission side clutch revolution speed thereof become higher than the revolution speed within the resonance revolution speed region.

12 Claims, 9 Drawing Sheets

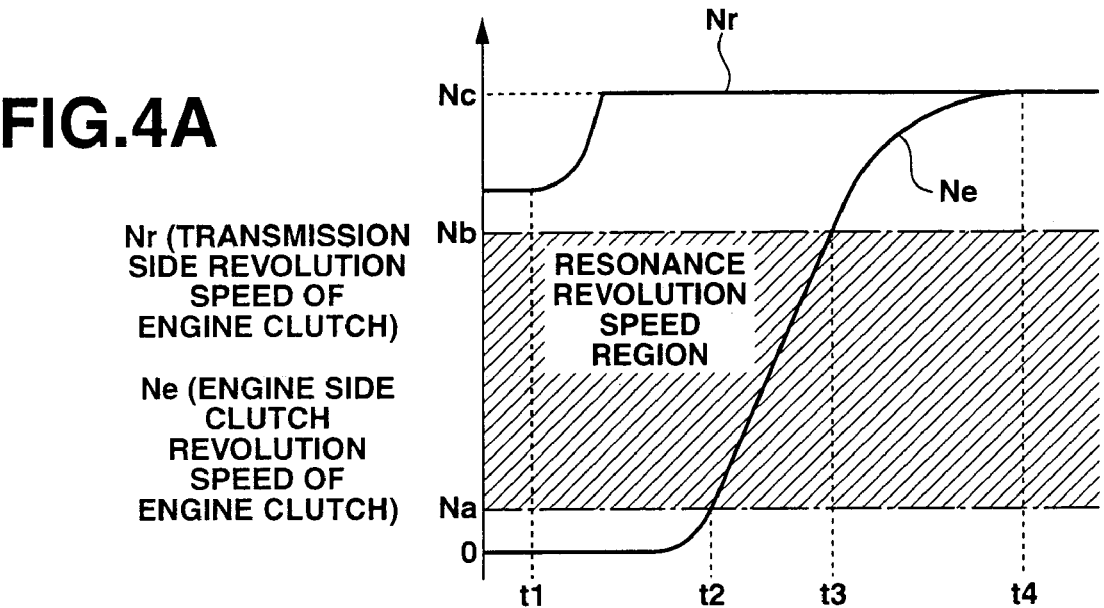
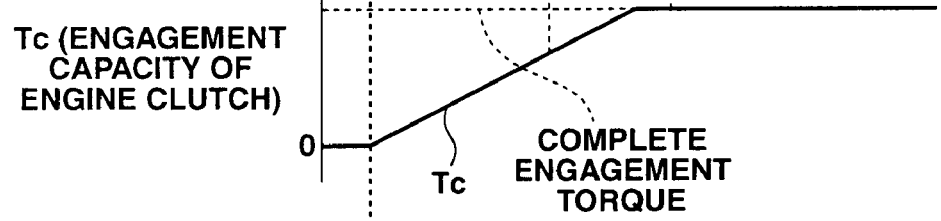
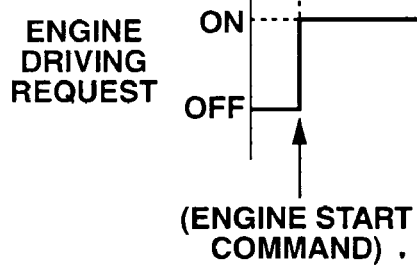

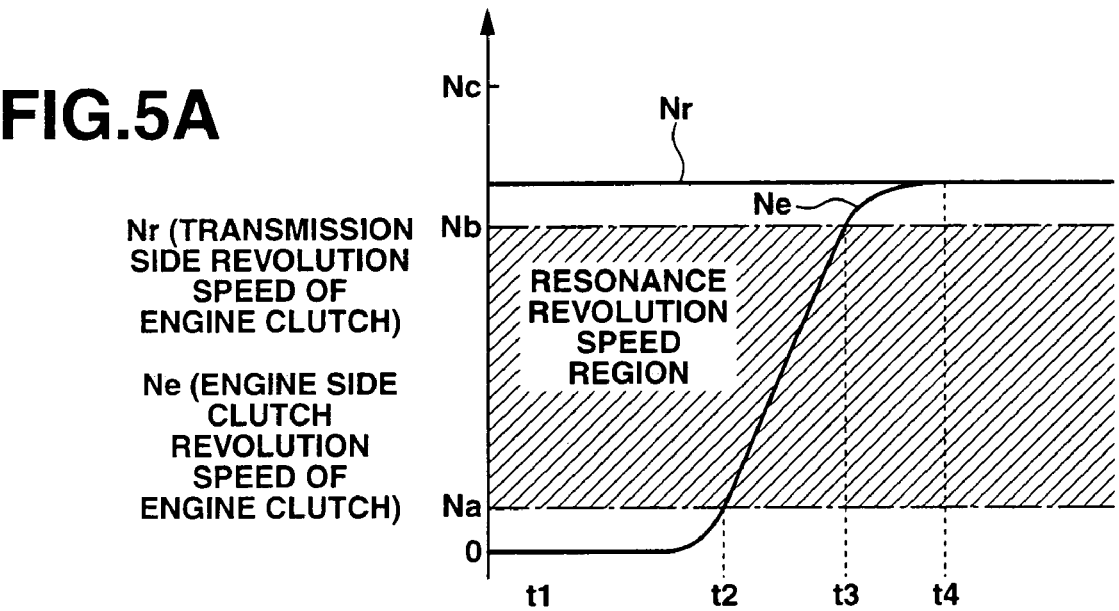
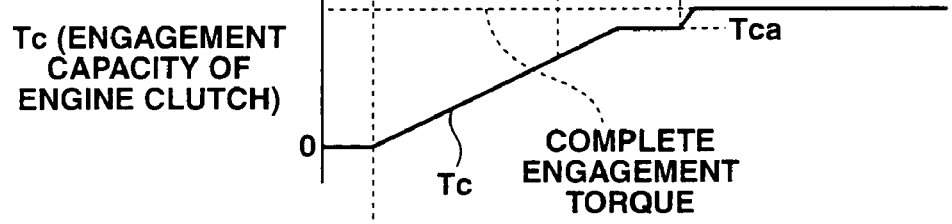
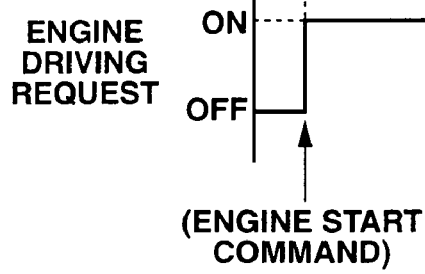

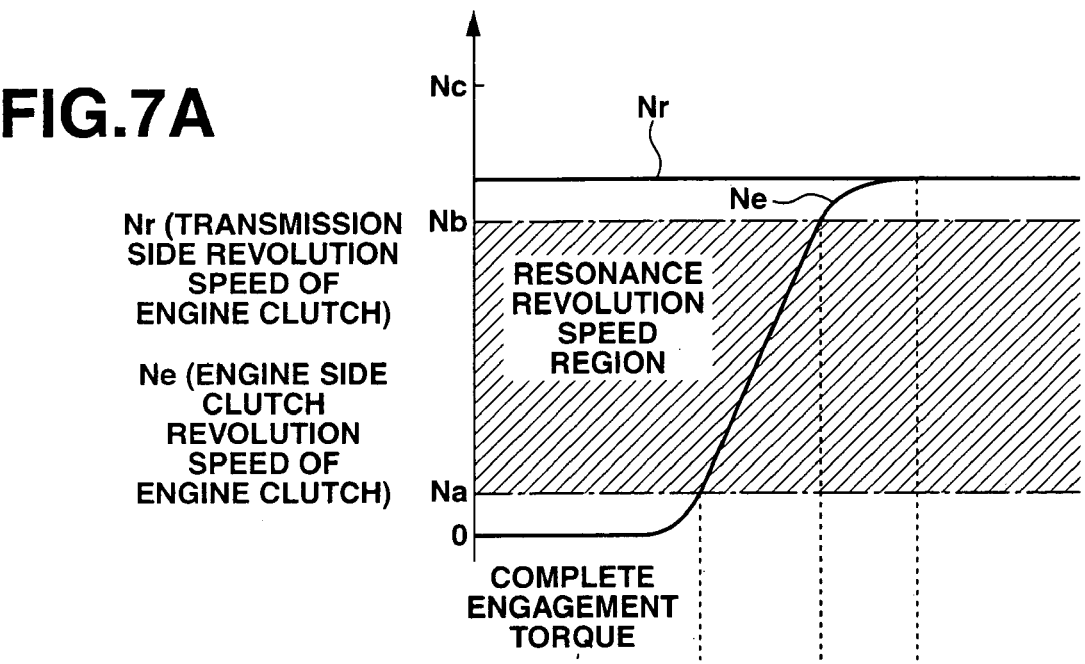
FIG.7A
Nr (TRANSMISSION SIDE REVOLUTION SPEED OF ENGINE CLUTCH)
Ne (ENGINE SIDE CLUTCH REVOLUTION SPEED OF ENGINE CLUTCH)
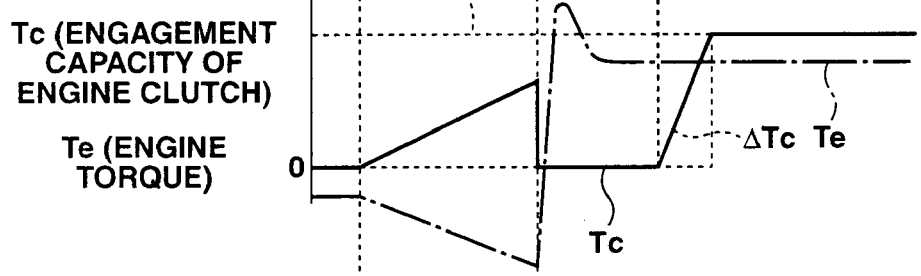
FIG.7B
Tc (ENGAGEMENT CAPACITY OF ENGINE CLUTCH)
Te (ENGINE TORQUE)
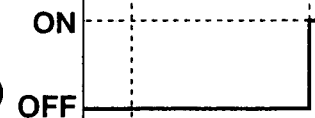
FIG.7C Fc (FUEL INJECTION COMMAND)
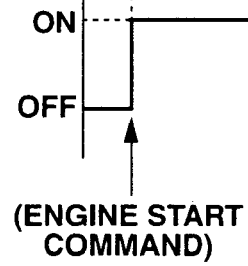
FIG.7D ENGINE DRIVING REQUEST
(ENGINE START COMMAND)

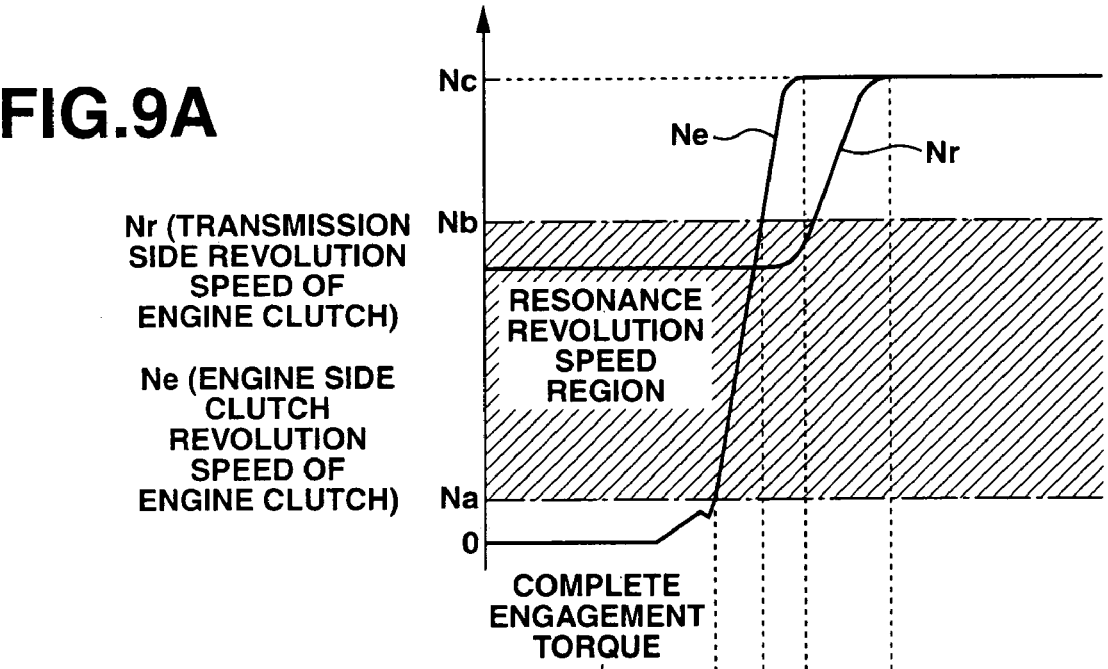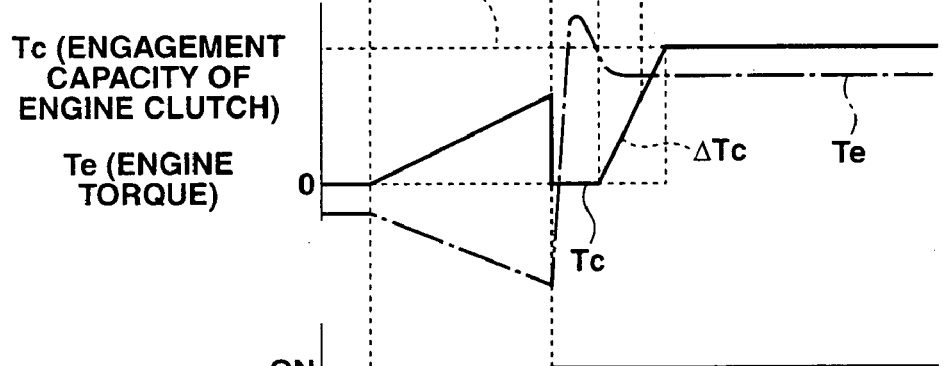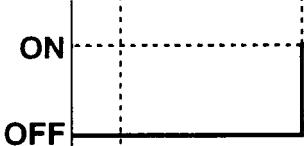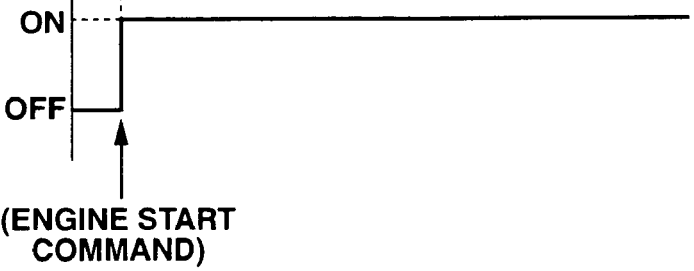

METHOD AND APPARATUS FOR ENGAGING ENGINE CLUTCH FOR HYBRID TRANSMISSION

BACKGROUND OF THE INVENTION

1. Field of the Invention

The present invention relates to method and apparatus for engaging an engine clutch for a hybrid transmission and more particularly relates to the method and apparatus for engaging the engine clutch to start an engine upon request of the engine start during an electric vehicle run by means of only a motor/generator.

2. Description of the Related Art

A hybrid transmission is constituted by a differential device which mutually links among an engine, an output axle, and at least one motor/generator. Thus, an automotive vehicle can be made in an electric vehicle run mode only by means of a power from the motor/generator and can be run in a hybrid vehicle run by means of an engine power and the power from the motor/generator. Any way, a merit of using the hybrid transmission is damaged since the engine becomes a load during the electric vehicle run and a wasteful consumption of an energy is large if one of revolutional elements constituting the differential device which is associated with the engine is always coupled to the engine. Therefore, as described in a Japanese Patent Application First Publication No. 2003-034154 published on Feb. 4, 2003 (which corresponds to a U.S. Patent Application Publication No. U.S. 2003/0073534A1), such a technique that an engine clutch is interposed between one of the revolutional elements of the differential device which is associated with the engine and the engine and, during the electric (vehicle) run, this engine clutch is released so as to be separated between the engine and the hybrid transmission has been proposed. On the other hand, in the hybrid transmission, the electric vehicle run is used from a viewpoint of a smooth start and an easiness in control during the start of the vehicle. In a case where a large driving force is demanded and it is necessary to transfer the vehicular run into a hybrid (vehicle) run, an engagement of the engine clutch causes the engine to be started so that a transfer to the hybrid vehicle run is requested. When the engine is started during the transfer from the electric vehicle run to the hybrid vehicle run, the engine clutch is engaged to couple between the engine and the hybrid transmission. Thus, with the engine cranked and a fuel supplied to the engine, the engine is started.

SUMMARY OF THE INVENTION

However, in a revolution transmission system from the engine to a transmission revolution output portion, a natural (inherent) resonance revolution speed region is present which is determined according to a resonance point of such a rotary body as the engine, the motor/generator, and so forth, and resonance points of an engine mount and a transmission mount. When the engine clutch is completely engaged in this resonance revolution speed region, in other words, when the revolution speed of the engine clutch during a complete engagement thereof (engine side clutch revolution speed=transmission side clutch revolution speed) is a revolution speed within the natural resonance revolution speed region, an unpleasant vibration or sound is produced and a mechanical defect in the rotary body more or less is developed.

It is, hence, an object of the present invention to provide method and apparatus for engaging an engine clutch for a hybrid transmission which can eliminate problems of producing an unpleasant vibration or sound and of developing a mechanical defect in a rotary body due to a resonance during a complete engagement of the engine clutch by completely engaging the engine clutch at the engine clutch revolution speed other than a revolution speed within a resonance revolution speed region.

According to one aspect of the present invention, there is provided a method for engaging an engine clutch for a hybrid transmission, in the hybrid transmission, the engine clutch being interposed between an engine and one of revolutional elements constituting a differential device and which is associated with the engine and the differential device mutually linking among the engine, an output axle, and at least one motor/generator, the method comprising: inhibiting a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion; and carrying out the complete engagement of the engine clutch when both of the engine side clutch revolution speed of the engine clutch and the transmission side clutch revolution speed thereof become higher than the revolution speed within the resonance revolution speed region.

According to another aspect of the present invention, there is provided an apparatus for engaging an engine clutch for a hybrid transmission, in the hybrid transmission, the engine clutch being interposed between an engine and one of revolutional elements constituting a differential device and which is associated with the engine and the differential device mutually linking among the engine, an output axle, and at least one motor/generator, the apparatus comprising: an inhibiting section that inhibits a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion; and a complete engagement carrying out section that carries out the complete engagement of the engine clutch when both of the engine side clutch revolution speed of the engine clutch and the transmission side clutch revolution speed thereof become higher than the revolution speed within the resonance revolution speed region.

This summary of the invention does not necessarily describe all necessary features so that the present invention may also be sub-combination of these described features.

BRIEF DESCRIPTION OF THE DRAWINGS

FIGS. 4A, 4B, and 4C are integrally a timing chart representing an engagement control of an engine clutch executed by a hybrid controller shown in FIG. 1 when the engine is started for explaining a first preferred embodiment of the engine clutch engaging method.

FIGS. 5A, 5B, and 5C are integrally a timing chart representing an engagement control of an engine clutch executed by a hybrid controller shown in FIG. 1 when the engine is started for explaining a second preferred embodiment of the engine clutch engaging method.

FIGS. 7A, 7B, 7C, and 7D are integrally a timing chart representing the engagement control of the engine clutch executed by the hybrid controller shown in FIG. 1 when the engine is started for explaining a fourth preferred embodiment of the engine clutch engaging method.

FIGS. 9A, 9B, 9C, and 9D are integrally a timing chart representing the engagement control of the engine clutch executed by the hybrid controller shown in FIG. 1 when the engine is started for explaining a sixth preferred embodiment of the engine clutch engaging method.

DETAILED DESCRIPTION OF THE PREFERRED EMBODIMENTS

Reference will hereinafter be made to the drawings in order to facilitate a better understanding of the present invention.

Figure 1:
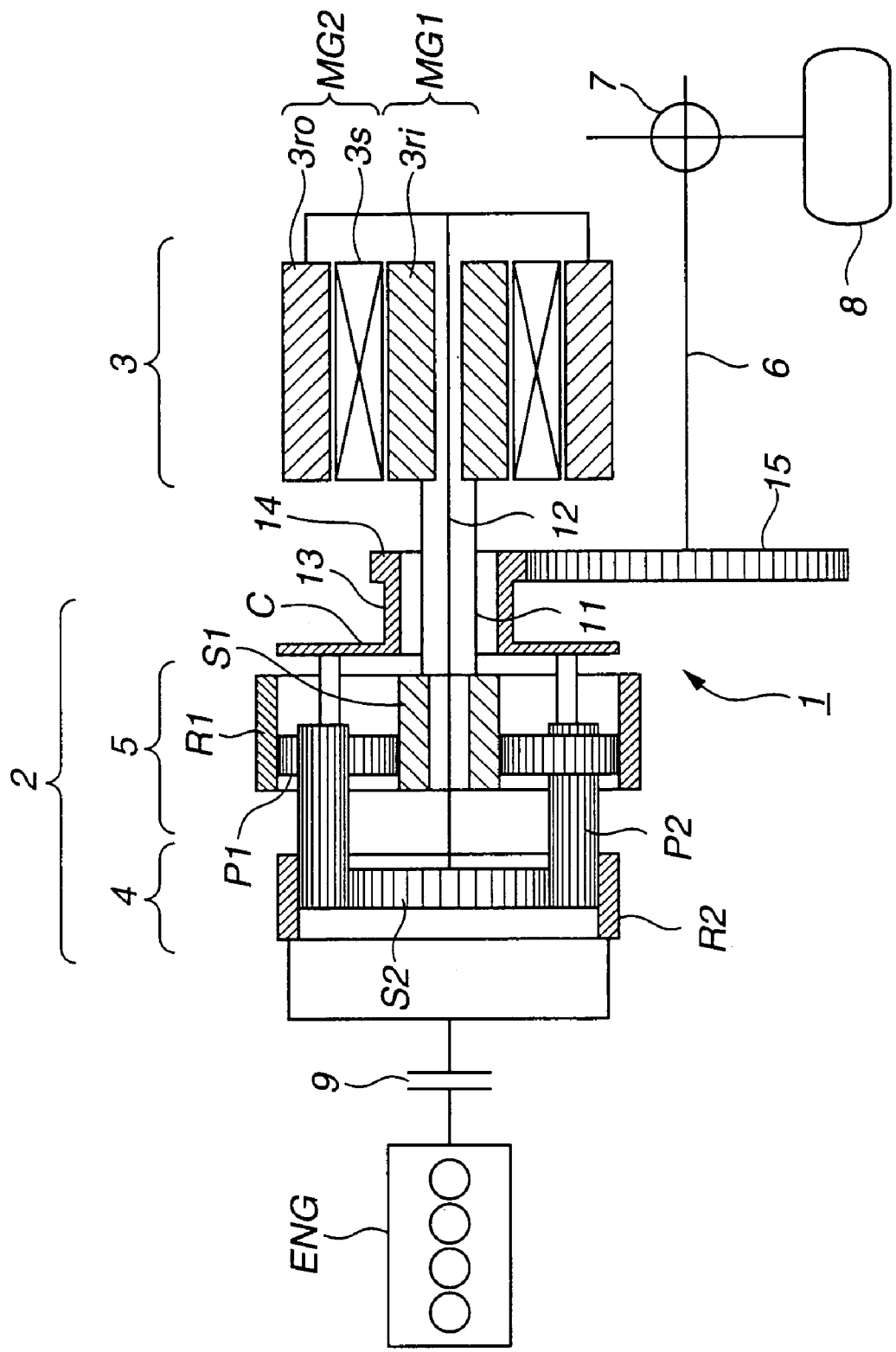
FIG. 1 is a diagrammatic configuration view of a hybrid transmission to which an engine clutch engaging method according to the present invention is applicable.

FIG. 1 shows a hybrid transmission 1 to which a method for engaging an engine clutch in a first preferred embodiment according to the present invention is applicable. In this embodiment, hybrid transmission 1 is constructed as a transaxle for a front-wheel drive vehicle (FF car). A Ravigneaux type planetary gear set 2 is incorporated into a transmission casing (not shown) at a left side of an axis line direction (left and right direction of FIG. 1) and a compound current two-layer motor 3 is incorporated thereinto at a right side of the axis line direction. An engine ENG is coaxially disposed at a further left side of Ravigneaux type planetary gear set 2 at an outside of the transmission casing. Ravigneaux type planetary gear set 2 and compound current two-layer motor 3 are coaxially disposed on a main axis line of hybrid transmission 1 and attached within the transmission casing. A counter shaft 6 which is juxtaposed with the main axis line with an offset from the main axis line and a differential gear unit 7 are incorporated into the transmission casing. Left and right driven wheels 8 are drivingly coupled to differential gear unit 7.

Ravigneaux type planetary gear set 2 is a combination of a single pinion planetary gear group 4 and a double pinion planetary gear group 5, each group having a common long pinion P2 and a common ring gear R2 and single pinion planetary gear group 4 is disposed at a position nearer to engine ENG than double pinion planetary gear group 5. Single pinion planetary gear group 4 includes a sun gear S2 and a ring gear R2 with each of which long pinion P2 is meshed and double pinion planetary gear group 5 includes a sun gear S1, a ring gear R1, and a large-diameter short pinion P1 meshed with these gears S1 and R1, large-diameter short pinion P1 being meshed with common pinion P2. All of pinions P1 and P2 of planetary gear groups 4 and 5 are rotatably supported by means of a common carrier C.

The above-described Ravigneaux type planetary gear set 2 has five revolutional members of sun gear S1, sun gear S2, ring gear R1, ring gear R2, and carrier C as main elements and constitutes the differential device of two degrees of freedom such that when the revolution speeds of two members from among the five members are determined, the revolution speeds of the other members are determined. A revolution speed descending order of the five revolution members is, as described by a lever diagram of FIG. 2, sun gear S1, ring gear R2, carrier C, ring gear R1, and sun gear S2.

Compound current two-layer motor 3 includes an inner rotor $3ri$ and an annular outer rotor $3ro$ enclosing inner rotor $3ri$, both rotors $3ri$ and $3ro$ being coaxially supported within the transmission casing. A coaxially arranged annular stator $3s$ is fixedly arranged in the annular space of the transmission casing between inner rotor $3ri$ and outer rotor $3ro$. Annular stator $3s$ and inner rotor $3ri$ constitute a first motor/generator MG1 which is an inner motor/generator and annular stator $3s$ and outer rotor $3ro$ constitutes a second motor/generator MG2 which is an outer motor/generator MG2. First motor/generator MG1 and second motor/generator MG2 function as motors which output revolutions of the individual speeds (including stop) in accordance with the supplied current in the individual directions in accordance with the supplied current when the compound current is supplied to the motor side as the load and functions as generators which develop electrical powers in accordance with external forces when the compound current is applied as the load at the generator side.

Figure 2:
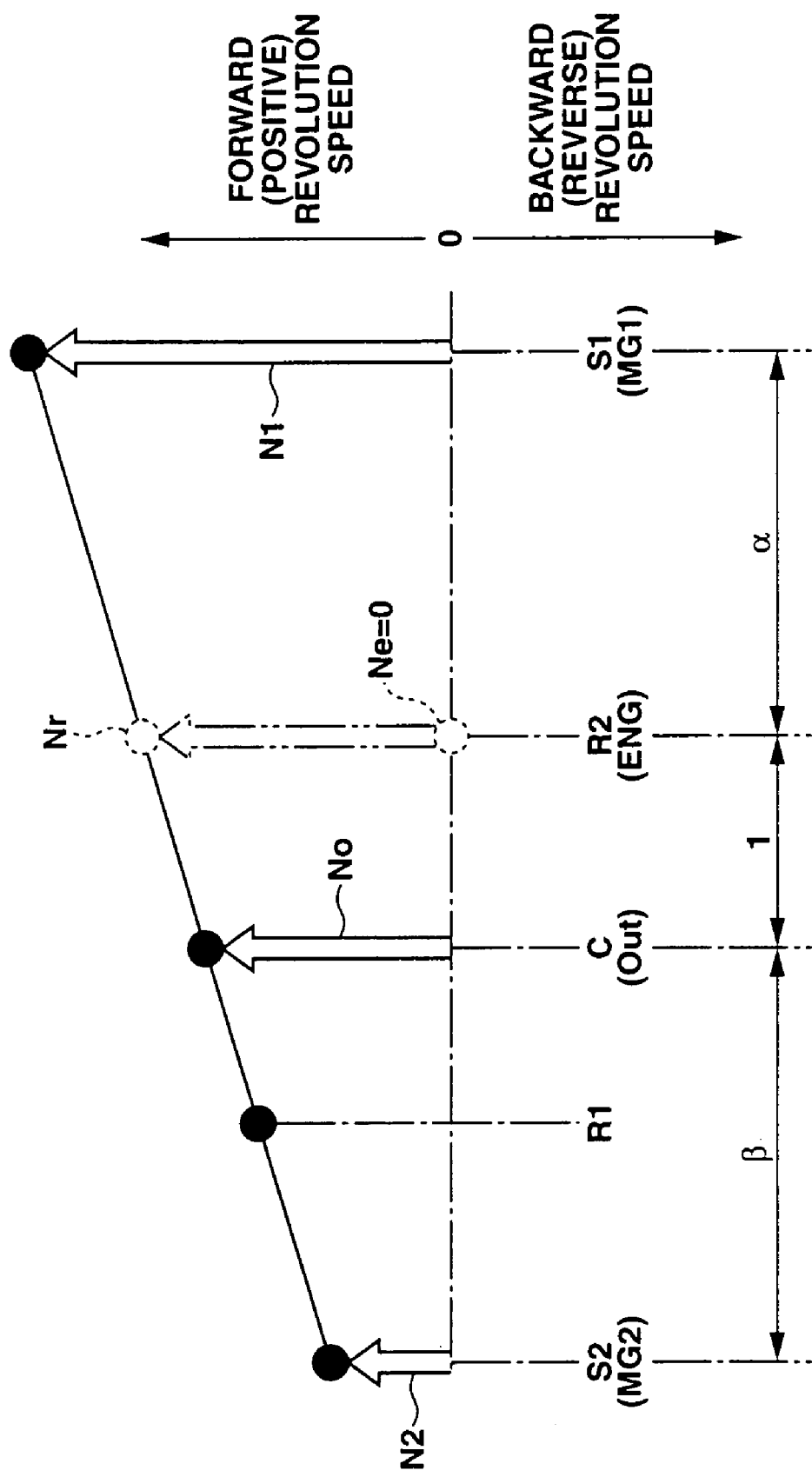
FIG. 2 is a lever diagram of the hybrid transmission shown in FIG. 1 in an electric vehicle run mode.

Five rotary (or revolutional) members of Ravigneaux type planetary gear set 2 are coupled in the revolution speed descending order, as shown in the lever diagram of FIG. 2, namely, sun gear S1, ring gear R2, carrier C, ring gear R1, and sun gear S2 are coupled to first motor/generator MG1, an input from engine ENG, an output (Out) from the wheel drive system, and a second motor/generator MG2. It is noted that ring gear R1 is not coupled.

As will be described in details below on the basis of FIGS. 1 and 2, since ring gear R2 provides an input element to which an engine revolution is inputted, a crankshaft of engine ENG is coupled to ring gear R2 via an engine clutch 9. Sun gear S1 is coupled to first motor/generator MG1 (inner rotor $4ri$) via a hollow axle 11 extended in a backward direction which is opposite to engine ENG. Sun gear S2 is coupled to second motor/generator MG2 (outer rotor $4ro$) via a center axle 12 to which first motor/generator MG1 and hollow axle 11 are fitted with a play.

Carrier C is an output element via which the revolution is outputted to the wheel drive system. An output gear 14 is coupled to carrier C via a hollow connecting member (output axle) 13. Output gear 14 is interposed between Ravigneaux type planetary gear set 2 and compound current two-layer motor 3 and is rotatably supported within the transmission casing. Output gear 14 is meshed with a counter gear 15 on a counter shaft 6. A transmission output revolution from output axle 14 is transmitted to differential gear unit 7 via counter gear 15 and, thereafter, via counter shaft 6. This differential gear unit distributes the transmission output revolution into left and right driven wheels 8. These gears, shaft, and differential gear unit constitute a wheel drive system. The hybrid transmission constructed as described above can be represented as the lever diagram shown in FIG. 2. A lateral axis of the lever diagram denotes a ratio of a distance between the rotary members determined according to the gear ratio of planetary gear groups 4 and 5. In other words, the ratio of the distance between sun gear S1 and ring gear R2 is denoted by α and the ratio of the distance between carrier C and sun gear S2 is denoted by β when the distance between ring gear R2 and carrier C is assumed to be 1. A longitudinal axis of the lever diagram shown in FIG. 2 denotes a revolution speed of each rotary member. That is to say, the longitudinal axis indicates an engine speed Ne which is directed toward ring gear R2 via engine clutch 9 (this Ne indicates an engine side (clutch) revolution speed of engine clutch 9 and the revolution speed of ring gear R2 is a transmission side (clutch) revolution speed of engine clutch 9), revolution speed N1 of sun gear S1 (first motor/generator MG1), an output (Out) revolution speed No from carrier C, and a revolution speed N2 of sun gear R1 (second motor/generator MG2), and a revolution speed of ring gear R1. If the revolution speeds of two rotary members are determined, the other two revolution speeds of the other two rotary members are determined.

A gear shift operation of the hybrid transmission will hereinafter be explained with reference to the lever diagram of FIG. 2. FIG. 2 shows the lever diagram during the electric vehicle run in which engine clutch 9 is released, engine ENG is stopped (Ne=0), and revolution speed No of output (Out) is determined only by a power (revolution speeds are represented by N1 and N2) from both of first and second motor/generators MG1 and MG2 (or one of first and second motor/generators MG1 and MG2). In this case, torques T1 and T2 of first and second motor/generators MG1 and MG2 and revolution speeds N1 and N2 thereof can be derived from the following equations using a transmission output torque To (which is proportional to a demanded driving force) and a transmission output revolution speed No (which is proportional to the vehicle speed).

$$N1=-\alpha No+(1+\alpha)Ne \quad (1)$$

$$N2=(1+\beta)No-\beta Ne \quad (2)$$

$$T1=\{\beta/(1+\alpha+\beta)\}\cdot To \quad (3)$$

$$T2=\{(1+\alpha)/(1+\alpha+\beta)\}To \quad (4)$$

Although this electric vehicle run mode is used as described above during the start of the vehicle, suppose a case where a demanded driving force becomes large during the electric vehicle run and the engine power is also required. In this case, engine clutch 9 is engaged so that engine speed Ne (engine side clutch revolution speed of engine clutch 9) is raised toward revolution speed Nr of ring gear R2 (transmission side clutch revolution speed of engine clutch 9 as denoted by an arrow mark depicted in a dot-dot-and-dash line in FIG. 2 from 0 in FIG. 2 and a given amount of fuel is injected into engine ENG to start engine ENG. Thus, the run mode is transferred from the electric vehicle run mode to a hybrid vehicle run mode using the engine power.

In this hybrid vehicle run mode, output (Out) revolution speed No is determined according to the power from engine ENG (engine clutch 9) and the power from both of first and second motor/generators MG1 and MG2 (or one of first and second motor/generators MG1 and MG2) and torques T1 and T2 of first and second motor/generators MG1 and MG2 and revolution speeds N1 and N2 thereof can be derived from the following equations using engine torque Te, transmission output torque To (which is proportional to the demanded driving force), and transmission output revolution speed No (which is proportional to the vehicle speed).

$$N1=-\alpha No+(1+\alpha)Ne \quad (5)$$

$$N2=(1+\beta)No-\beta Ne \quad (6)$$

$$T1=\{1/(1+\alpha+\beta)\}\{To-(1+\beta)Te\} \quad (7)$$

$$T2=To-T1-Te \quad (8)$$

Figure 3:
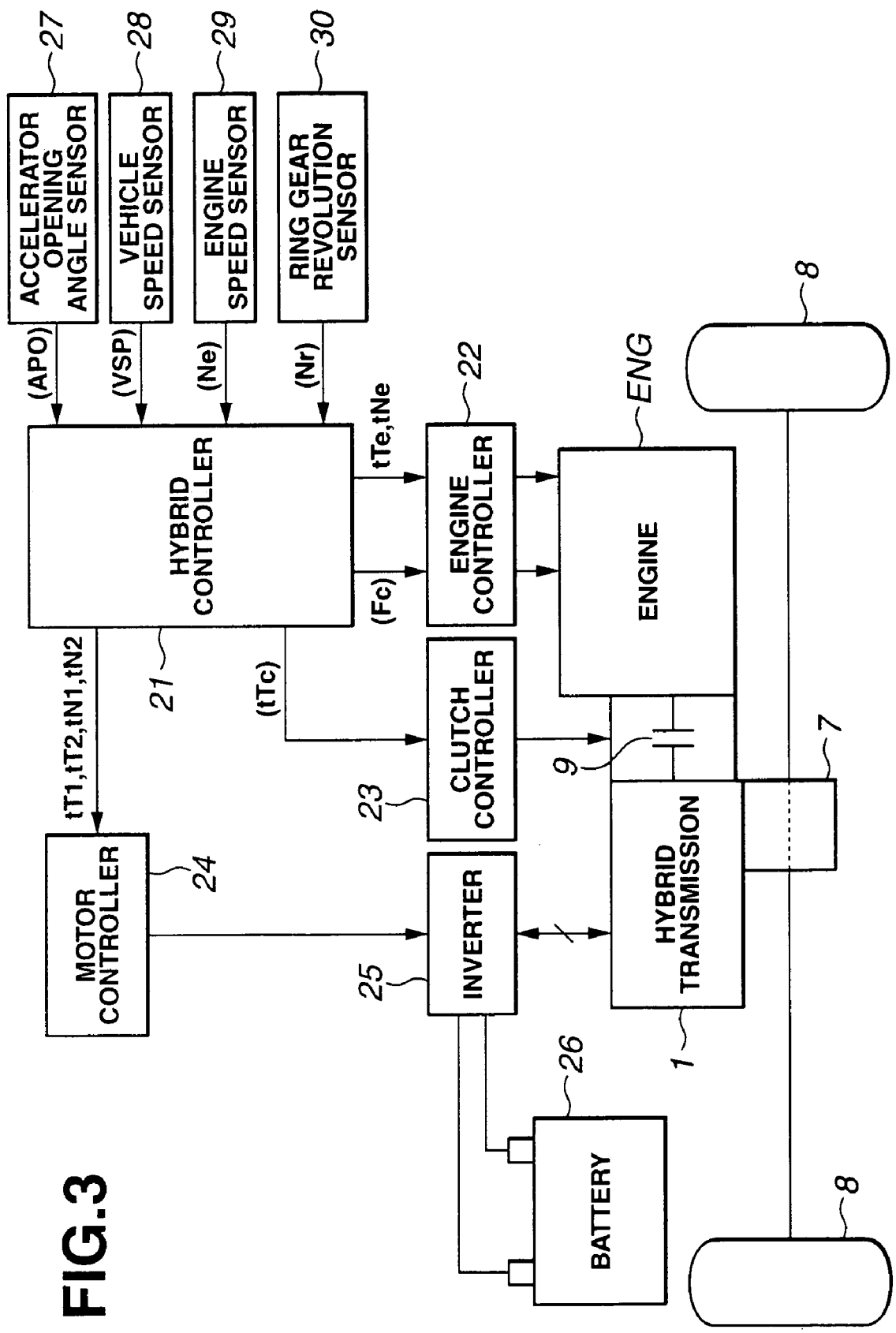
FIG. 3 is a block diagram of a control system for the hybrid transmission shown in FIG. 1.

An engagement control of engine clutch 9 and a gear shift control of hybrid transmission 1 to be executed when the run mode is transferred from the electric vehicle run mode to the hybrid vehicle run mode and engine clutch 9 is engaged and engine ENG is started are executed by a system shown in FIG. 3. In FIG. 3, a reference numeral 21 denotes a hybrid controller which performs an integrated control for engine ENG and hybrid transmission 1. This hybrid controller 21 supplies commands on a target torque tTe and a target revolution speed tNe of engine ENG and a fuel injection command Fc to engine controller 22. Engine controller 22 performs and does not perform the fuel injection for engine ENG in accordance with ON and OFF of fuel injection command Fc and is driven so that engine ENG achieves the above-described target values of tTe and tNe.

Hybrid controller 21 further supplies a command on a target torque (a clutch engagement capacity) tTc of engine clutch 9 to a clutch controller 23. Clutch controller 23 controls an engagement force of engine clutch 9 to achieve target torque (clutch engagement capacity) tTc. It is noted that engine clutch 9 is an arbitrary type such as a hydraulic type or electromagnetic type and a control over the hydraulic or electromagnetic force in accordance with the clutch type can achieve target torque (clutch engagement capacity) tTc.

Hybrid controller 21 furthermore supplies command signals on target torques tT1 and tT2 and target revolution speeds tN1 and tN2 of first and second motor/generators MG1 and MG2 to a motor controller 24. Motor controller 24 controls first and second motor/generators MG1 and MG2 so as to achieve target torques tT1 and tT2 and target revolution speeds tN1 and tN2 via an inverter 25 and a battery 26. For the gear shift control and engagement control of engine clutch 9, hybrid controller 21 receives a signal from accelerator opening angle sensor 27 to detect a depression depth (accelerator opening angle) APO, a signal from a vehicle speed sensor 28 to detect vehicle speed VSP (which is proportional to output revolution speed No), and a signal from ring gear revolution sensor 30 to detect revolution speed Nr of ring gear R2 (transmission side revolution speed of engine clutch 9). Hybrid controller 21 determines the run mode from demanded driving force F, vehicle speed VSP, and a charged state of battery 26 (output enable power) determined from these input information, executes the gear shift control in accordance with the determined (selected) mode, and determines and commands target engine torque tTe and target motor/generator torques tT1 and tT2. These controls are well known and do not have a relation to the present invention. Therefore, the detailed description thereof will herein be omitted. It is noted that revolution speed information inputted to hybrid controller 21 is not only limited to engine speed Ne and vehicle speed VSP (output revolution speed No) but may be any two revolution speeds of the rotary members of Ravigneaux type planetary gear set 2 since the differential device constituted by Ravigneaux type planetary gear set 2 has two degrees of freedom.

The engagement control of engine clutch 9 required to start engine ENG during the transfer of the run mode from the electric vehicle run mode to the hybrid vehicle run mode will be described in details hereinbelow. FIGS. 4A, 4B, and 4C integrally show a timing chart of the engagement control of engine clutch 9 for explaining the first embodiment of the engine clutch engaging method. In this first embodiment, a resonance revolution speed region of a revolution transmission system from engine ENG to a transmission revolution output portion (namely, differential gear unit 7) is in a revolution speed region from Na through Nb. The resonance revolution speed region Na through Nb is natural (specific or inherent) to the vehicle determined according to a resonance point of the rotary body such as an engine ENG and first and second motor/generators MG1, MG2 and according to resonance points of an engine ENG mount and a hybrid transmission 1 mount. In this resonance revolution speed region Na through Nb, when engine clutch 9 is completely clutched so that engine side clutch revolution speed Ne is made coincident with transmission side clutch revolution speed Nr, the resonance causes an unpleasant vibration or sound is developed and a mechanical defect in the rotary body more or less occurs.

To solve the above-described problem, in the first embodiment shown in FIGS. 4A through 4C, when a driving request of engine ENG is issued at an instantaneous time t1 and an engine start command is issued at instantaneous time t1, hybrid controller 21 checks transmission side clutch revolution speed Nr of engine clutch 9 at instantaneous time t1. In a case where transmission side clutch revolution speed Nr is the revolution speed within resonance revolution speed region Na through Nb or in a case where transmission side clutch revolution speed Nr is a high revolution speed such as to fall within the resonance revolution region Na through Nb due to a temporary reduction of the revolution speed to be generated at the time of the complete engagement of engine clutch 9 even though transmission side clutch revolution speed Nr is higher than the revolution speed within resonance revolution speed region Na through Nb, transmission side clutch revolution speed Nr is increased by the control over first and second motor/generators MG1 and MG2 to a set revolution speed Nc such that transmission side clutch revolution speed Nr does not fall within resonance frequency region Na through Nb due to the temporary reduction of the revolution speed to be generated at the time of the complete engagement of engine clutch 9. It should be noted that the speed rise control for transmission side clutch revolution speed Nr by means of first and second motor/generators MG1 and MG2 is not executed in a case where transmission side clutch revolution speed Nr is equal to or higher than set revolution speed Nc.

The engagement force of engine clutch 9 is increased from instantaneous time t1 at which the engine start command is issued so that its engagement capacity Tc is progressively increased from zero and engine side clutch revolution speed Ne of engine clutch 9 is raised via a slip coupling of engine clutch 9. The progressive increase speed of engine clutch engagement capacity Tc is determined in association with the rise in transmission side clutch revolution speed Nr by means of first and second motor/generators MG1 and MG2. The engine clutch capacity Tc is progressively increased at a speed such that engine clutch 9 is completely engaged (the engagement state to make Ne equal to Nr (Ne=Nr) after (for example, an instantaneous time t4) transmission side clutch revolution speed Nr is raised to set revolution speed Nc.

According to the first embodiment of engine clutch engaging method, during a time interval from an instantaneous time t2 to an instantaneous time t3 at least one of engine side clutch revolution speed Ne and transmission side clutch revolution speed Nr falls within resonance revolution speed region Na through Nb, the complete engagement of engine clutch 9 is inhibited. Hence, the complete engagement of engine clutch 9 is not carried out at the revolution speed within resonance revolution speed region Na through Nb and the problem such that the complete engagement of engine clutch 9 is carried out at the revolution speed within resonance frequency region Na through Nb so that the unpleasant vibration or sound due to the resonance phenomenon and the mechanical defect in the rotary body is developed can be eliminated.

In addition, according to the engaging method of engine clutch in this embodiment, since at instantaneous time at which both of engine side revolution speed Ne of engine clutch 9 and transmission side revolution speed Nr are higher than the revolution speed within resonance frequency region Na through Nb, the complete engagement of engine clutch 9 is carried out, the transfer of the run mode from the electric vehicle run to the hybrid vehicle run can be assured while avoiding the above-described problem.

Furthermore, according to the engine clutch engaging method in this embodiment, in a case where transmission side clutch revolution speed Nr of engine clutch 9 at instantaneous time t1 at which the engine start command is issued falls within the resonance revolution speed region Na through Nb or in a case where transmission side revolution speed Nr is the revolution speed having a height such that transmission side clutch revolution speed Nr falls within resonance revolution region Na through Nb due to the temporary reduction of the revolution developed during the complete engagement of engine clutch 9 even if transmission side clutch revolution speed Nr is higher than resonance revolution speed region, after transmission side clutch revolution speed Nc such that transmission side clutch revolution speed Nr is not the revolution speed within resonance revolution speed region Na through Nb, engine clutch 9 is completely engaged. Hence, even though the temporary reduction of revolution developed during the complete engagement, engine clutch 9 is not completely engaged at the resolution speed within resonance revolution speed region Na through Nb. The problem such that the unpleasant vibration or sound due to the resonance is developed and the mechanical defect in the rotary body is developed can furthermore positively be eliminated.

Next, FIGS. 5A, 5B, and 5C integrally show a timing chart of another example of the engagement control for explaining a second embodiment of the engine clutch engaging method. In the same way as in the case of the first embodiment, in this embodiment, the resonance revolution speed region in the revolution transmission system from engine ENG to gear shift (transmission) revolution output portion (differential gear unit 7) is the revolution speed region from Na through Nb.

When engine clutch 9 is completely engaged at resonance revolution speed region Na through Nb (engine side clutch revolution speed Ne is made coincident with transmission side clutch revolution speed Nr), the resonance causes the unpleasant vibration or sound to be developed and the mechanical defect occurs in the rotary body. To solve this problem, in the embodiment shown in FIGS. 5A through 5C, the engagement of engine clutch 9 is controlled as follows.

That is to say, when the driving request of engine ENG is developed at instantaneous time t1 and the engine start command is issued at this time t1, integrated controller 21 checks transmission side clutch revolution speed Nr of engine clutch 9. In a case where transmission side clutch revolution speed Nr is higher than the revolution speed within resonance revolution speed region Na through Nb but is the revolution speed having the height such as to fall within resonance revolution speed region Na through Nb due to the temporary reduction of the revolution speed of engine clutch 9 to be developed at the time of the complete engagement of engine clutch 9, the engagement force of engine clutch 9 is increased so that engagement capacity Tc thereof is progressively increased from zero so that engine side clutch revolution speed Ne of engine clutch 9 is raised via the slip coupling of engine clutch 9.

During a time interval between instantaneous times t2 and t3, engine side clutch revolution speed Ne is the revolution speed within resonance revolution speed region Na through Nb. During a time interval after an arbitrary timing during the time interval up to instantaneous time t3, the engagement force of engine clutch 9 is held in such a way that engagement capacity Tc of engine clutch 9 is held at a capacity Tca at the above-described timing. After the slip coupling through the holding of engagement capacity Tc at Tca, engagement capacity Tc is raised to a maximum value.

In the engine clutch engaging method in the second embodiment according to the present invention, during the time interval between instantaneous times t2 and t3, at least one of engine side revolution speed Ne and transmission side revolution speed Nr is the revolution speed within resonance revolution region Na through Nb. During this time interval, the complete engagement of engine clutch 9 is inhibited. Hence, the complete engagement of engine clutch 9 at the revolution speed within resonance revolution speed region Na through Nb is not carried out and the problem such that the unpleasant vibration or sound is developed due to the resonance and the mechanical defect occurs in the rotary body when the complete engagement of engine clutch 9 at the revolution speed within resonance revolution speed region Na through Nb is carried out can be eliminated.

In addition, according to the engine clutch engaging method in this embodiment, the complete engagement of engine clutch 9 is carried out at an instantaneous time t4 at which both of engine side clutch revolution speed Ne of engine clutch 9 and transmission side clutch revolution speed Nr are higher than the revolution speed within resonance revolution speed region Na through Nb. Hence, the transfer of the run mode from the electric vehicle run to the hybrid vehicle run can be secured while avoiding the problem.

Furthermore, according to the engine clutch engaging method in this embodiment, during the time interval between instantaneous times t2 and t3 at which engine side clutch revolution speed Ne is the revolution speed within resonance revolution speed region Na through Nb, the engagement force of engine clutch 9 during the time interval from the arbitrary timing to instantaneous time t3 is held in such a way that its engagement capacity Tc is a capacity (Tca) at the arbitrary timing. Hence, during the time interval from the arbitrary timing to the time at which engine clutch 9 is completely engaged, a speed of the complete engagement of engine clutch 9 becomes moderate so that the temporary reduction of the revolution at the time of the complete engagement of engine clutch 9 can be made small or can be prevented from occurring.

Hence, according to this second embodiment of the engine clutch engaging method, even in a case where transmission side clutch revolution speed Nr of engine clutch 9 at instantaneous time t1 at which the engine start command is issued is the revolution speed having the height such that transmission side revolution speed Nr falls within resonance revolution speed region Na through Na due to the temporary reduction in the revolution speed to be developed during the complete engagement of engine clutch 9, transmission side clutch revolution speed Nr does not fall within resonance revolution speed region Na through Nb at the time of the complete engagement of engine clutch 9. Then, the complete engagement at the revolution speed within resonance revolution speed region Na through Nb can be avoided and the problem such that the unpleasant vibration or sound due to the resonance is developed and the mechanical defect in the rotary body occurs can more positively be eliminated.

Figure 6A:
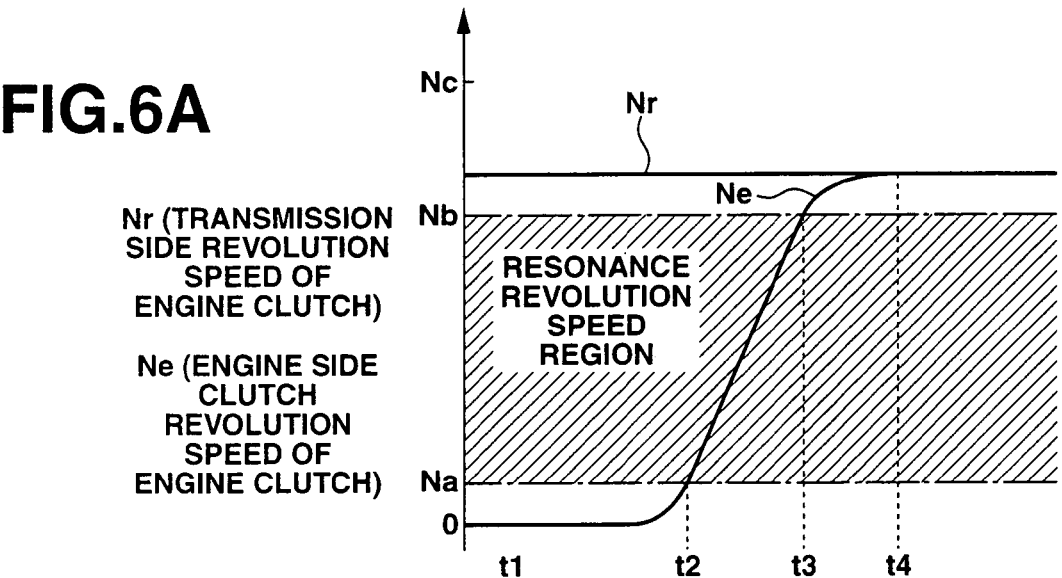
FIGS. 6A, 6B, and 6C are integrally a timing chart representing an engagement control of an engine clutch executed by a hybrid controller shown in FIG. 1 when the engine is started for explaining a third preferred embodiment of the engine clutch engaging method.
Figure 6B:
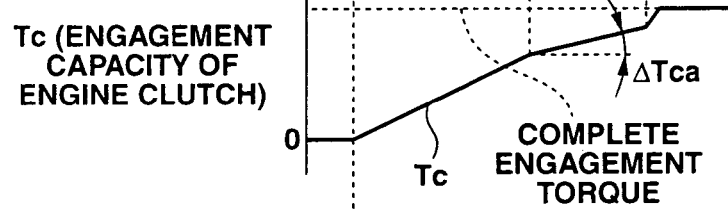
Figure 6C:
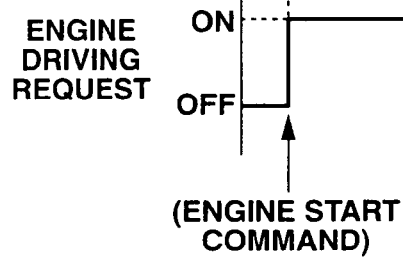
Figure 8A:
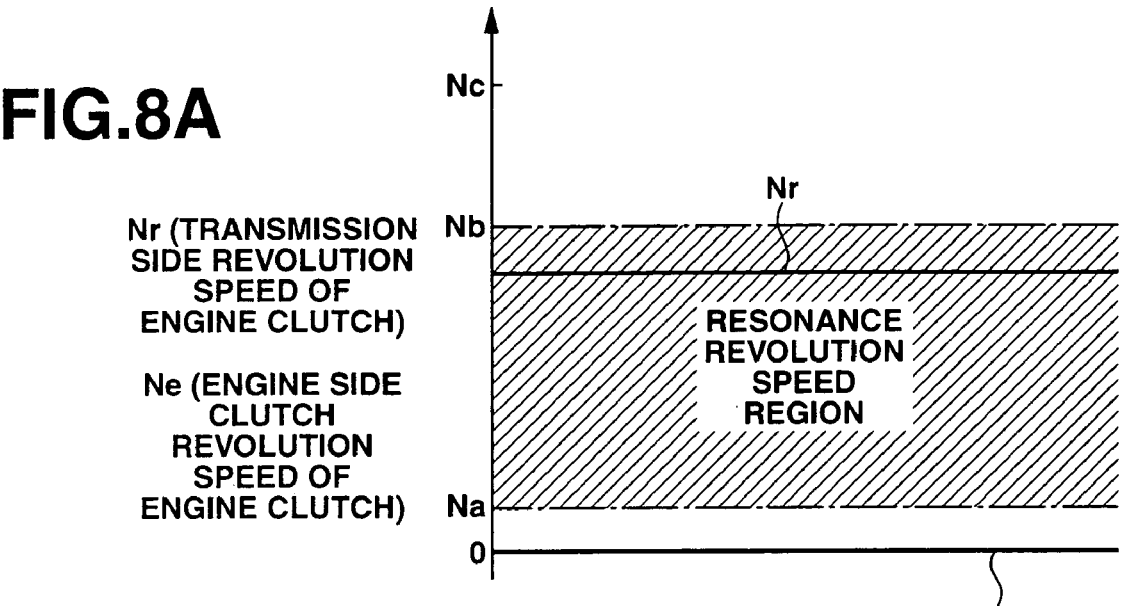
FIGS. 8A, 8B, 8C, and 8D are integrally a timing chart representing the engagement control of the engine clutch executed by the hybrid controller shown in FIG. 1 when the engine is started for explaining a fifth preferred embodiment of the engine clutch engaging method.
Figure 8B:
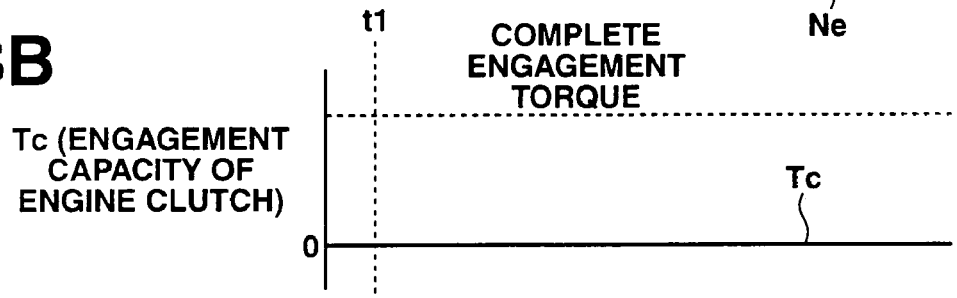
Figure 8C:
Figure 8D:
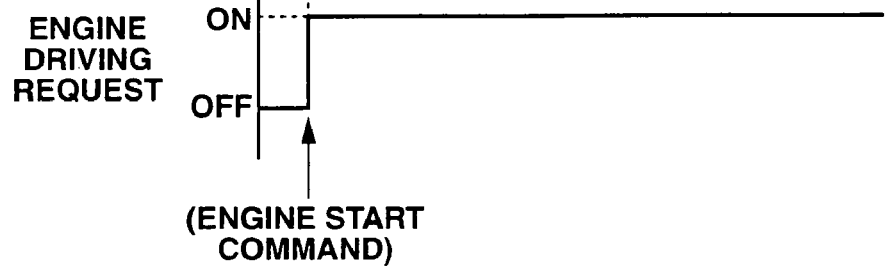

FIGS. 6A, 6B, and 6C integrally show a timing chart of the engagement control of engine clutch for explaining a third preferred embodiment of the engine clutch engaging method according to the present invention. In this embodiment, in the same way as in the case of FIGS. 4A through 4C, the resonance revolution speed region of the revolution transmission system from engine ENG to the transmission revolution output portion (differential gear unit 7) is the revolution speed region from Na through Nb. When engine clutch 9 is completely engaged in resonance revolution speed region Na through Nb (engine side clutch revolution is made coincident with transmission side clutch revolution speed Nr), the resonance causes the unpleasant vibration or sound to be developed and the mechanical defect in the rotary body occurs. To solve this problem, in the embodiment shown in FIGS. 6A through 6C, the engagement of engine clutch 9 is controlled in the following way.

That is to say, when the engine start command is issued at instantaneous time t1 to which driving request of engine ENG is generated, integrated controller 21 checks transmission side clutch revolution speed Nr of engine clutch 9. In a case where, even if transmission side clutch revolution speed Nr is higher than the revolution speed within resonance revolution speed region Na through Nb, transmission side clutch revolution speed Nr is the revolution speed having the height such as to fall within resonance revolution speed region Na through Nb due to the temporary reduction of the revolution speed to be developed during the complete engagement of engine clutch 9, the engagement force of engine clutch 9 is augmented so that engagement capacity Tc is progressively increased from zero and engine side clutch revolution speed Ne of engine clutch is raised via the slip coupling of engine clutch 9.

Then, during the time interval between instantaneous times t2 and t3, engine side clutch revolution speed Ne is the revolution speed within resonance revolution speed region Na through Nb. During this time interval, the engagement force of engine clutch 9 is augmented in such a way that engagement capacity Tc is progressively increased at an increase rate ΔTca which is smaller than the capacity increase rate up to instantaneous time t2 and is raised to the maximum value after the slip coupling.

According to the engine clutch engaging method in the third embodiment according to the present invention, during the time interval between instantaneous times t2 and t3, at least one of engine side revolution speed Ne and transmission side revolution speed Nr is the revolution speed within resonance revolution region Na through Nb. During this time interval, the complete engagement of engine clutch 9 is inhibited. Hence, the complete engagement of engine clutch 9 at the revolution speed within resonance revolution speed region Na through Nb is not carried out and the problem such that the unpleasant vibration or sound is developed due to the resonance and the mechanical defect occurs in the rotary body when the complete engagement of engine clutch 9 at the revolution speed within resonance revolution speed region Na through Nb is carried out can be eliminated.

In addition, according to the engine clutch engaging method in this embodiment, the complete engagement of engine clutch 9 is carried out at an instantaneous time t4 at which both of engine side clutch revolution speed Ne of engine clutch 9 and transmission side revolution speed Nr are higher than the revolution speed within resonance revolution speed region Na through Nb. Hence, the transfer of the run mode from the electric vehicle run to the hybrid vehicle run can be secured while avoiding the problem.

Furthermore, according to the engine clutch engaging method in this embodiment, during the time interval between instantaneous times t2 and t3 at which engine side clutch revolution speed Ne is the revolution speed within resonance revolution speed region Na through Nb, the engagement force of engine clutch 9 is augmented so that engagement capacity Tc is progressively increased at the increase rate ΔTca which is smaller than the capacity increase rate up to instantaneous time t2. Hence, during the time interval from instantaneous time t2 to the time at which engine clutch 9 is completely engaged, a speed of the complete engagement of engine clutch 9 becomes moderate so that the temporary reduction of the revolution at the time of the complete engagement of engine clutch 9 can be made small or can be prevented from occurring.

Hence, according to this embodiment of the engine clutch engaging method, even in a case where transmission side clutch revolution speed Nr of engine clutch 9 at instantaneous time t1 at which the engine start command is issued is the revolution speed having the height such that transmission side revolution speed Nr falls within resonance revolution speed region Na through Na due to the temporary reduction in the revolution developed during the complete engagement of engine clutch 9, transmission side clutch revolution speed Nr does not fall within resonance revolution speed region Na through Nb at the time of the complete engagement of engine clutch 9. Then, the complete engagement at the revolution speed within resonance revolution speed region Na through Nb can be avoided and the problem such that the unpleasant vibration or sound due to the resonance is developed and the mechanical defect in the rotary body occurs can more positively be eliminated.

FIGS. 7A, 7B, 7C, and 7D integrally show a timing chart of another example of the engagement control of engine clutch 9 for explaining a fourth preferred embodiment of the engine clutch engaging method according to the present invention. In this embodiment, in the same way as in the case of FIGS. 4A through 4C, the resonance revolution speed region of the revolution transmission system from engine ENG to the transmission revolution output portion (differential gear unit 7) is the revolution speed region from Na to Nb. When engine clutch 9 is completely engaged in resonance revolution speed region Na through Nb (engine side clutch revolution speed Ne is made coincident with transmission side clutch revolution speed Nr), the resonance causes the unpleasant vibration or sound to be developed and the mechanical defect in the rotary body occurs. To solve this problem, in the embodiment shown in FIGS. 7A through 7D, the engagement of engine clutch 9 is controlled in the following way.

That is to say, when the engine start command is issued at instantaneous time t1 to which driving request of engine ENG is generated, integrated controller 21 checks transmission side revolution speed Nr of engine clutch 9. In a case where, even if transmission side clutch revolution speed Nr is higher than the revolution speed within resonance revolution speed region Na through Nb, transmission side clutch revolution speed Nr is the revolution speed having the height such as to fall within resonance revolution speed region Na through Nb due to the temporary reduction of the revolution speed to be developed during the complete engagement of engine clutch 9, the engagement force of engine clutch 9 is augmented so that engagement capacity Tc is progressively increased from zero and engine side clutch revolution speed Ne of engine clutch 9 is raised via the slip coupling of engine clutch 9.

During the time interval between instantaneous times t2 and t3, the raised engine side clutch revolution speed Ne is the revolution speed within resonance revolution speed region Na through Nb. During this time interval, the engagement of engine clutch 9 is halted and engine clutch 9 is released so that its engagement capacity Tc is reduced to zero. Immediately before engine clutch 9 is released, engine ENG is started by an engine cranking by an engagement advance of engine clutch 9 and a fuel injection command Fc so that engine torque Te is varied in a time series as shown in FIG. 7B. After instantaneous time t3 at which engine side clutch revolution speed Ne of engine clutch 9 becomes the revolution speed higher than resonance revolution speed region Na through Nb, engine clutch 9 is again engaged (reengaged) and engine clutch 9 is completely engaged at instantaneous time t4.

According to the engine clutch engaging method in this embodiment according to the present invention, during the time interval between instantaneous times t2 and t3, at least one of engine side revolution speed Ne and transmission side revolution speed Nr is the revolution speed within resonance revolution region Na through Nb. During this time interval, the complete engagement of engine clutch 9 is inhibited. Hence, the complete engagement of engine clutch 9 at the revolution speed within resonance revolution speed region Na through Nb is not carried out and the problem such that the unpleasant vibration or sound is developed due to the resonance and the mechanical defect occurs in the rotary body when the complete engagement of engine clutch 9 at the revolution speed within resonance revolution speed region Na through Nb is carried out can be eliminated.

In addition, according to the engine clutch engaging method in this embodiment, the complete engagement of engine clutch 9 is carried out at an instantaneous time t4 at which both of engine side clutch revolution speed Ne of engine clutch 9 and transmission side revolution speed Nr are higher than the revolution speed within resonance revolution speed region Na through Nb. Hence, the transfer of the run mode from the electric vehicle run to the hybrid vehicle run can be secured while avoiding the problem.

Furthermore, according to the engine clutch engaging method in this embodiment, during the time interval between instantaneous times t2 and t3 during which engine side clutch revolution speed Ne is the revolution speed within resonance revolution speed region Na through Nb, the engagement advance of engine clutch 9 is halted, engine clutch 9 is released, immediately before the release, engine ENG is started according to fuel injection command Fc, after instantaneous time t3 at which engine side clutch revolution speed Ne becomes the revolution speed higher than the revolution speed within resonance revolution speed region Na through Nb, engine clutch 9 is reengaged, and, at instantaneous time t4, engine clutch 9 is completely engaged so that, due to the start of engine, engine side clutch revolution speed Ne is raised to the revolution speed higher than the revolution speed within resonance revolution speed region Na through Nb. Thus, the temporary reduction of the revolution speed at the time of the complete engagement of engine clutch 9 can be made small or can be prevented from occurring. Hence, according to this embodiment, even in a case where transmission side clutch revolution speed Nr at instantaneous time t1 at which engine start command is issued is the revolution speed having the height such that transmission revolution speed Tr falls within resonance revolution speed region Na through Nb due to the temporary reduction of the revolution developed at the time of complete engagement of engine clutch 9, transmission side clutch revolution speed Nr does not fall within resonance revolution speed region Na through Nb, engine clutch 9 is avoided from the complete engagement at the revolution speed within resonance revolution speed region Na through Nb, such a problem that the unpleasant vibration or sound due to the resonance is developed and the mechanical defect in the rotary body occurs can furthermore positively eliminated.

It is noted that, in this embodiment, in a case where the reengagement (engaging again) of engine clutch after instantaneous time t3 is carried out at a predetermined time variation gradient of engagement capacity (ΔTc) such that engine side revolution speed Ne is smoothly made coincident with transmission side clutch revolution speed Nr of engine clutch 9, the temporary reduction of the revolution speed at the time of the complete engagement of engine clutch 9 can assuredly be prevented and the above-described action and advantage can furthermore be assured.

FIGS. 8A, 8B, 8C, and 8D are integrally a timing chart of another example of the engagement control of engine clutch 9 for explaining a fifth preferred embodiment of the engine clutch engaging method according to the present invention. In this embodiment, in the same way as in the case of FIGS. 4A through 4C, the resonance revolution speed region of the revolution transmission system from engine ENG to the transmission revolution output portion (differential gear unit 7) is the revolution speed region from Na to Nb. When engine clutch 9 is completely engaged in resonance revolution speed region Na through Nb (engine side clutch revolution is made coincident with transmission side clutch revolution speed Nr), the resonance causes the unpleasant vibration or sound to be developed and the mechanical defect in the rotary body occurs. To solve this problem, in the embodiment shown in FIGS. 8A through 8D, the engagement of engine clutch 9 is controlled in the following way.

That is to say, when the driving request of engine ENG is generated at instantaneous time t1 and the engine start command is issued at instantaneous time t1, integrated controller 21 checks transmission side clutch revolution speed Nr. In a case where transmission side clutch revolution speed is the revolution speed that falls within resonance revolution speed region Na through Nb, the engagement force of engine clutch 9 after instantaneous time t1 at which the engine start command is issued is not developed as shown in engagement capacity Tc=0 (refer to FIG. 8B) and the engagement advance itself of engine clutch 9 is inhibited. It is of course that fuel injection command Fc to engine ENG is not issued.

According to the engine clutch engaging method in this embodiment, during the time interval during which at least one of engine side revolution speed Ne and transmission side revolution speed Nr is the revolution speed within resonance revolution speed region Na through Nb, the complete engagement of engine clutch 9 is inhibited. The complete engagement of engine clutch 9 at the revolution speed within resonance revolution speed region Na through Nb is not carried out. Hence, the problem such that the complete engagement of engine clutch 9 at the revolution speed within resonance revolution speed region Na through Nb is carried out so that the unpleasant vibration or sound is developed due to the resonance and the mechanical defect in the rotary body occurs can be eliminated.

FIGS. 9A, 9B, 9C, and 9D are integrally a timing chart of further another example of the engagement control for explaining a sixth preferred embodiment of the engine clutch engaging method according to the present invention. In this embodiment, in the same way as in the case of FIGS. 4A through 4C, the resonance revolution speed region of the revolution transmission system from engine ENG to the transmission revolution output portion (differential gear unit 7) is the revolution speed region from Na to Nb. When engine clutch 9 is completely engaged in resonance revolution speed region Na through Nb (engine side clutch revolution is made coincident with transmission side clutch revolution speed Nr), the resonance causes the unpleasant vibration or sound to be developed and the mechanical defect in the rotary body occurs. To solve this problem, in the embodiment shown in FIGS. 9A through 9D, the engagement of engine clutch 9 is controlled in the following way.

That is to say, when the driving request of engine ENG is generated at instantaneous time t1 and the engine start command is issued at same instantaneous time t1, integrated controller 21 checks transmission side clutch revolution speed Nr. In a case where transmission side clutch revolution speed Nr is the revolution speed within resonance revolution speed region Na through Nb, at this time, the engagement force of engine clutch 9 is augmented for engagement capacity Tc to be progressively increased from zero at instantaneous time t1 at which the engine start command is issued and engine side clutch revolution speed Ne is raised via the slip coupling of engine clutch 9. During the time interval between instantaneous time t2 and t3, the raised engine side clutch revolution speed Ne is the revolution speed within resonance revolution speed region Na through Nb. During this time interval, the engagement of engine clutch 9 is halted, engine clutch 9 is released so as to zero its engagement capacity Tc. Immediately before the release of engine clutch 9, and engine ENG is started by the cranking of engine according to the engagement advance of engine clutch 9 and fuel injection command Fc to engine ENG so that engine torque Te is varied in the time series as shown in FIG. 9B.

After instantaneous time t3 at which engine side clutch revolution speed Ne of engine clutch 9 is the revolution speed higher than resonance revolution speed region Na through Nb, the rise in engine speed raises engine side clutch revolution speed Ne. Then, preferably, engine side clutch revolution speed Ne is raised to set revolution speed Nc such that, even if the temporary reduction of the revolution is developed during the complete coupling of engine clutch, engine side clutch revolution speed Ne does not fall within resonance revolution speed region Na through Nb. At an instantaneous time t3' at which engine side clutch revolution speed Ne is raised to become set revolution speed Nc, engine clutch 9 is again engaged as shown in the time series variation of engagement capacity Tc and, at instantaneous time t4, engine clutch 9 is completely engaged.

According to the engine clutch engaging method in this embodiment, during the time interval up to instantaneous time t3 during which at least one of engine side revolution speed Ne and transmission side revolution speed Nr is the revolution speed within resonance revolution speed region Na through Nb of the revolution transmission system, the complete engagement of engine clutch 9 is inhibited. Hence, the complete engagement of engine clutch 9 at revolution speed within resonance revolution speed region Na through Nb is not carried out. Thus, the problem such that the complete engagement of engine clutch 9 is carried out at the revolution speeds within resonance revolution speed region Na through Nb so that the unpleasant vibration or sound is developed due to the resonance and the mechanical defect in the rotary body occurs can be eliminated.

In addition, according to the engine clutch engaging method in this embodiment, the complete engagement of engine clutch 9 is carried out at instantaneous time t4 at which both of engine side clutch revolution speed Ne and transmission side clutch revolution speed Nr are higher than the revolution speed within resonance revolution speed region Na through Nb. The transfer of the run mode from the electric vehicle run to the hybrid vehicle run can assuredly be carried out.

Furthermore, according to the engine clutch engaging method in this embodiment, during the time interval between instantaneous times t2 and t3 during which engine side clutch revolution speed Ne is the revolution speed within resonance revolution speed region Na through Nb, the engagement advance of engine clutch 9 is halted, engine clutch 9 is released, immediately before the release, engine ENG is started according to fuel injection command Fc, after instantaneous time t3 at which engine side clutch revolution speed Ne becomes the revolution speed higher than the revolution speed within resonance revolution speed region Na through Nb, engine clutch 9 is again engaged, and, at instantaneous time t4, engine clutch 9 is completely engaged. Hence, even if transmission side clutch revolution speed Nr of engine clutch 9 at instantaneous time t1 at which the engine start command is issued is the revolution speed within resonance revolution speed region Na through Nb, after instantaneous time t3' (instantaneous time t4) at which transmission side clutch revolution speed Nr is raised so that engine side clutch revolution speed Ne becomes higher than the revolution speed within resonance revolution speed region Na through Nb due to the reengagement (engaging again) and, when Ne=Nr, engine clutch 9 is completely engaged. Thus, even if transmission side clutch revolution speed Nr of engine clutch 9 at instantaneous time t1 at which the engine start command is issued is the revolution speed within resonance revolution speed region Na through Nb, the complete engagement of engine clutch 9 at the revolution speed within resonance revolution speed region Na through Nb is not carried out. Then, the problem such that the complete engagement of engine clutch 9 at the revolution speed within resonance revolution speed region Na through Nb is carried out so that the unpleasant vibration or sound is developed due to the resonance and the mechanical defect in the rotary body occurs can be eliminated.

It is noted that, in this embodiment, when engine side clutch revolution speed Ne is raised according to the engine start to a revolution speed higher than the revolution speed within resonance revolution speed region Na through Nb, engine side clutch revolution speed Ne is raised to set revolution speed Nc such that engine side clutch revolution speed Ne is not the revolution speed within resonance revolution speed region Na through Nb even though the temporary reduction of the revolution to be developed during the complete engagement of engine clutch 9. Thus, a more positive elimination of the above-described problem can be achieved.

The entire contents of a Japanese Patent Application No. 2004-068715 (filed in Japan on Mar. 11, 2004) are herein incorporated by reference. The scope of the invention is defined with reference to the following claims.

What is claimed is:

1. A method for engaging an engine clutch for a hybrid transmission, in the hybrid transmission, the engine clutch being interposed between an engine and one of revolutional elements constituting a differential device and which is associated with the engine and the differential device mutually linking among the engine, an output axle, and at least one motor/generator, the method comprising: inhibiting a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion; and carrying out the complete engagement of the engine clutch when both of the engine side clutch revolution speed of the engine clutch and the transmission side clutch revolution speed thereof become higher than the revolution speed within the resonance revolution speed region.

2. A method for engaging an engine clutch for a hybrid transmission as claimed in claim 1, wherein, after the motor/generator is controlled for the transmission side clutch revolution speed of the engine clutch to be raised to such a set revolution speed as not to fall within the resonance revolution speed region due to a temporary reduction of the revolution speed to be developed at the time of the complete engagement of the engine clutch, the complete engagement of the engine clutch is carried out.

3. A method for engaging an engine clutch for a hybrid transmission as claimed in claim 1, wherein, in a case where the transmission side clutch revolution speed of the engine clutch is the revolution speed which is higher than the revolution speed within the resonance revolution speed region but is the revolution speed such as to fall within the resonance revolution speed region due to a temporary reduction of the revolution speed to be developed at the time of the complete engagement of the engine clutch, an engagement speed of the engine clutch is limited to become moderate and the engine clutch is completely engaged after a slip coupling thereof.

4. A method for engaging an engine clutch for a hybrid transmission as claimed in claim 3, wherein a limitation of the engagement speed of the engine clutch is achieved by a temporary holding of an engagement capacity of the engine clutch.

5. A method for engaging an engine clutch for a hybrid transmission as claimed in claim 3, wherein a limitation of the engagement speed of the engine clutch is achieved by a reduction in a raising speed of an engagement capacity of the engine clutch.

6. A method for engaging an engine clutch for a hybrid transmission as claimed in claim 1, wherein, in a case where the transmission side clutch revolution speed of the engine clutch is the revolution speed higher than the revolution speed within the resonance revolution speed region but is the revolution speed such as to fall within the resonance revolution speed region due to a temporary reduction of the revolution speed to be developed at the time of the complete engagement of the engine clutch, the engagement of the engine clutch is halted while the engine side clutch revolution speed is the revolution speed which falls within the resonance revolution speed region and the engine clutch is released, the engine is started at a time immediately before the release of the engine clutch by an engine cranking according to an engagement advance of the engine clutch and a fuel supply to the engine, and the engine clutch is completely engaged by a re-engagement of the engine clutch when the engine side clutch revolution speed of the engine clutch is the revolution speed higher than the revolution speed within the resonance revolution speed region.

7. A method for engaging an engine clutch for a hybrid transmission as claimed in claim 6, wherein the re-engagement of the engine clutch is carried out at a predetermined time variation gradient of an engagement capacity such that the engine side clutch revolution speed of the engine clutch is smoothly made coincident with the transmission side clutch revolution speed thereof.

8. A method for engaging an engine clutch for a hybrid transmission as claimed in claim 1, wherein, when the transmission side clutch revolution speed is the revolution speed within the resonance revolution speed region, the engagement advance of the engine clutch itself is inhibited.

9. A method for engaging an engine clutch for a hybrid transmission as claimed in claim 1, wherein, in a case where the transmission side revolution speed of the engine clutch is the revolution speed within the resonance revolution speed region, the engagement of the engine clutch is halted and the engine clutch is released, the engine is started at a time immediately before the release of the engine clutch by an engine cranking according to an engagement advance of the engine clutch and a fuel supply to the engine, and the engine clutch is completely engaged by a re-engagement of the engine clutch when the engine side clutch revolution speed of the engine clutch is higher than the revolution speed of the resonance revolution speed region.

10. A method for engaging an engine clutch for a hybrid transmission as claimed in claim 9, wherein the engine side clutch revolution speed after the start of the engine is a set revolution speed which does not fall within the resonance revolution speed region even though a temporary reduction of the revolution speed to be developed at the time of the complete engagement of the engine clutch.

11. An apparatus for engaging an engine clutch for a hybrid transmission, in the hybrid transmission, the engine clutch being interposed between an engine and one of revolutional elements constituting a differential device and which is associated with the engine and the differential device mutually linking among the engine, an output axle, and at least one motor/generator, the apparatus comprising: an inhibiting section that inhibits a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion; and a complete engagement carrying out section that carries out the complete engagement of the engine clutch when both of the engine side clutch revolution speed of the engine clutch and the transmission side clutch revolution speed thereof become higher than the revolution speed within the resonance revolution speed region.

12. An apparatus for engaging an engine clutch for a hybrid transmission, in the hybrid transmission, the engine clutch being interposed between an engine and one of revolutional elements constituting a differential device and which is associated with the engine and the differential device mutually linking among the engine, an output axle, and at least one motor/generator, the apparatus comprising: inhibiting means for inhibiting a complete engagement of the engine clutch while at least one of an engine side clutch revolution speed of the engine clutch and a transmission side clutch revolution speed thereof is a revolution speed within a resonance revolution speed region of a revolution transmission system from the engine to a transmission revolution output portion; and complete engagement carrying out means for carrying out the complete engagement of the engine clutch when both of the engine side clutch revolution speed of the engine clutch and the transmission side clutch revolution speed thereof become higher than the revolution speed within the resonance revolution speed region.

* * * * *